Feb. 7, 1939.  G. WHITE  2,146,390
APPARATUS AND METHOD USED IN TEMPERING GLASS
Filed Feb. 29, 1936  2 Sheets-Sheet 1
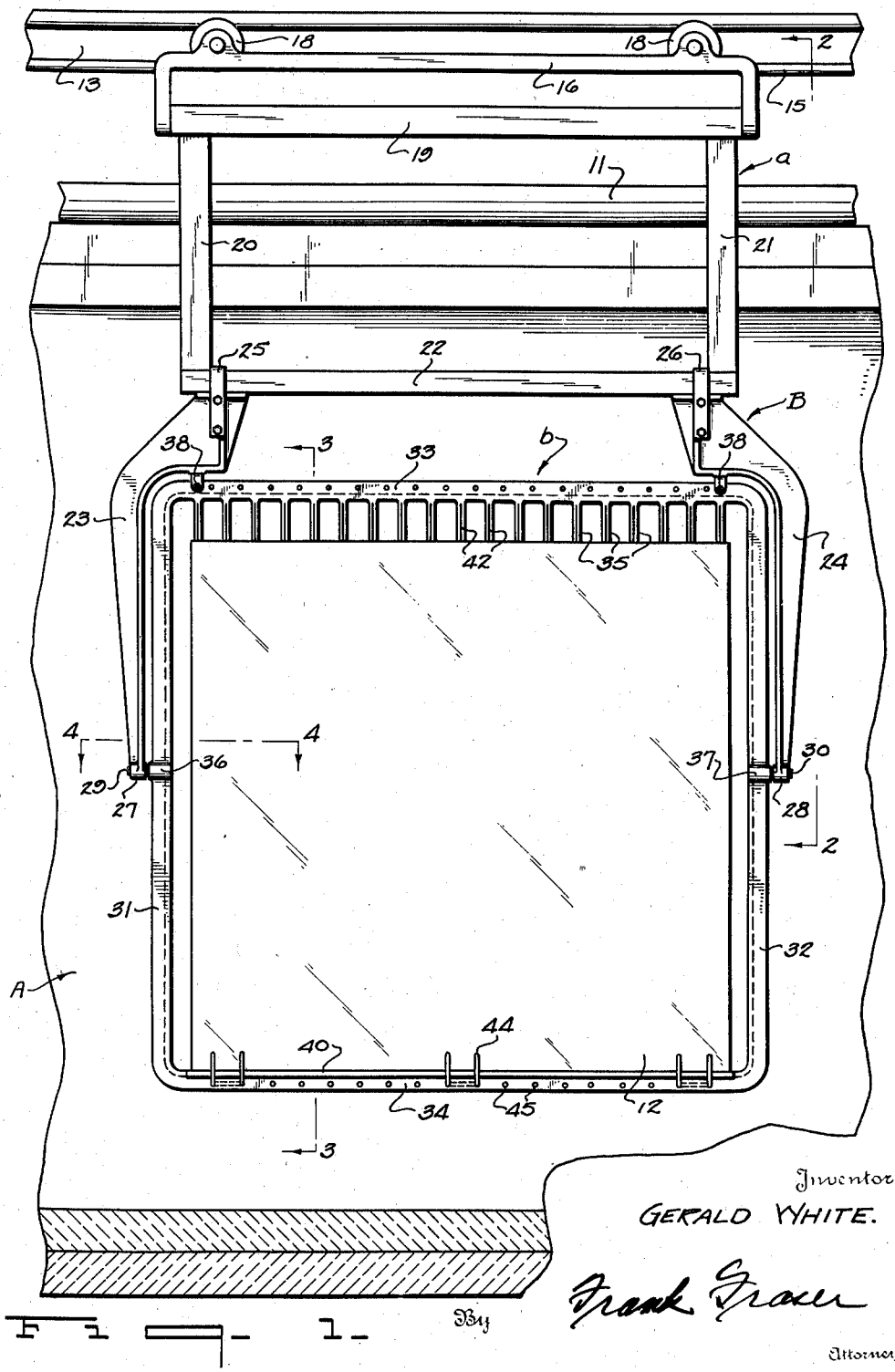
Inventor
GERALD WHITE.
By Frank Fraser
Attorney

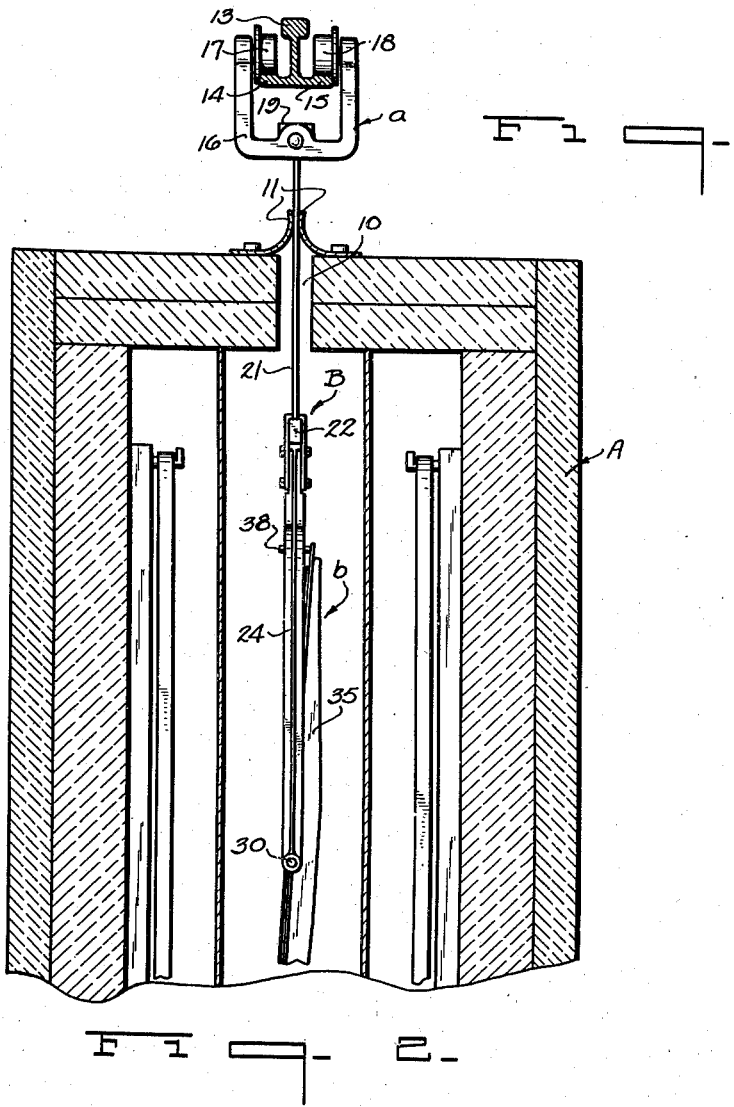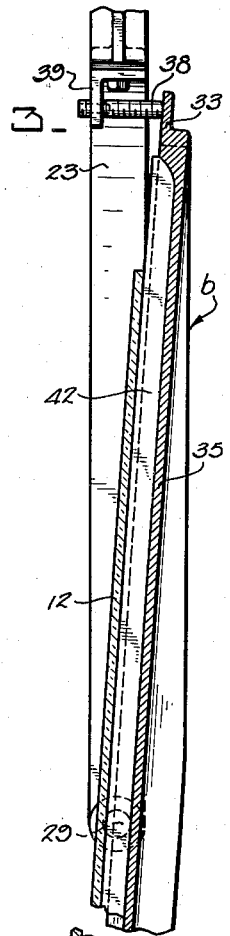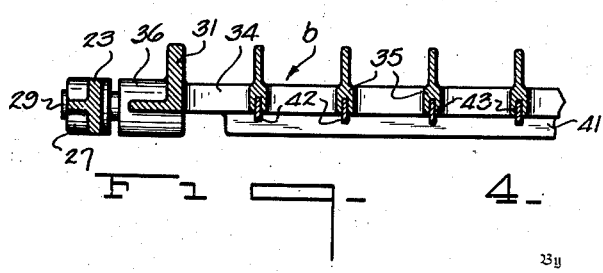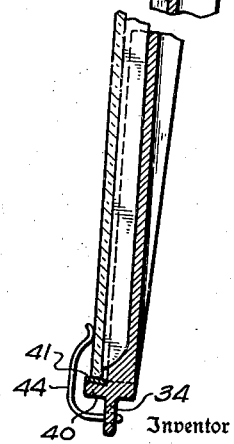

Patented Feb. 7, 1939

2,146,390

UNITED STATES PATENT OFFICE 2,146,390

APPARATUS AND METHOD USED IN TEMPERING GLASS

Gerald White, Toledo, Ohio, assignor to Libbey-Owens-Ford Glass Company, Toledo, Ohio, a corporation of Ohio Application February 29, 1936, Serial No. 66,367

4 Claims. (Cl. 49—14)

This invention relates to apparatus for and a method of tempering glass sheets and more particularly to the means for supporting the same during the tempering thereof.

In the present commercial practice of tempering glass sheets, the said sheets are first heated to approximately the point of softening of the glass and then quickly cooled by directing blasts of air against opposite surfaces thereof simultaneously. In tempering glass sheets in this manner, the sheet must be supported so that it is free to expand and contract in its own plane and to this end it has been customary to suspend the sheet from a plurality of relatively small tongs or hooks which engage opposite faces of the said sheet near its upper edge. The sheet is also usually provided with small nicks or notches which are engageable by the said hooks or tongs. The supporting of the sheet in this manner is, however, open to objection since it involves the marring of the glass. This marring of the glass sheet would not be so objectionable were it possible to trim the sheet after tempering but glass so tempered cannot be subsequently cut without resulting in the complete shattering thereof.

The invention has for its primary object the elimination of the tongs or hooks heretofore employed for supporting the sheet as well as the necessity for nicking or notching the glass and the provision of improved means for effectively supporting the glass sheet during tempering in such a manner that the said sheet will not be marred or defaced thereby.

Another object of the invention is the provision of improved supporting means which will maintain the glass sheet against warping during the sudden cooling thereof while at the same time permitting the sheet to expand and contract in its own plane.

A further object of the invention is the provision of improved means for supporting the glass sheet on edge in an inclined position in such a manner as to overcome any tendency of the sheet to sag or buckle upon the heating thereof preliminary to cooling.

Other objects and advantages of the invention will become more apparent during the course of the following description when taken in connection with the accompanying drawings.

In the drawings wherein like numerals are employed to designate like parts throughout the same, Fig. 1 is a side elevation of the improved supporting means constructed in accordance with the invention and shown in relation to a furnace within which the sheets are adapted to be heated;

Fig. 2 is a vertical sectional view taken substantially on line 2—2 of Fig. 1;

Fig. 3 is a vertical sectional view taken substantially on line 3—3 of Fig. 1; and Fig. 4 is a horizontal sectional view taken substantially on line 4—4 of Fig. 1.

With reference to the drawings, there is shown diagrammatically a furnace designated in its entirety by the letter A, while the means for supporting the glass sheet within the furnace is designated generally by the letter B. The supporting means B includes a supporting carriage $a$ and a sheet holding rack $b$ pivotally mounted thereon.

Since the particular construction of the furnace A constitutes no part of the present invention, it will not be described in detail. The furnace is, however, preferably of the electrically heated type and is provided with a slot 10 in the top thereof normally closed by strips 11 of asbestos or the like. The glass sheet 12 to be tempered is positioned upon the supporting means B outside the furnace and is then moved along through the furnace which is in the form of a tunnel kiln of gradually increasing temperature. When the glass sheet has reached a proper temperature for chilling, it is removed through the outlet end of the furnace and subjected immediately to the action of suitable cooling means, not shown, but which operation is well known in the art.

The supporting carriage $a$ of the sheet supporting means B is mounted for movement along a mono-rail 13 extending longitudinally above the slot 10 in the top of the furnace A and being provided with the oppositely directed horizontal flanges 14 and 15. The carriage comprises a trolley 16 having at each end wheels 17 and 18 which ride on the flanges 14 and 15 of the rail 13. The trolley 16 carries a longitudinally extending horizontal bar 19 from the opposite ends of which depend the vertical hangers 20 and 21 connected together at their lower ends by a horizontal supporting bar 22 to form a rigid frame. The asbestos strips 11, while serving as a closure for the slot 10 in the top of the furnace, nevertheless permit the ready passage of the hangers 20 and 21 therebetween upon movement of the trolley 16 along rail 13.

Carried by the horizontal supporting bar 22, adjacent the opposite ends thereof, are the hanger brackets 23 and 24 secured to the said bar by straps 25 and 26 respectively. These hanger brackets are in the form of relatively long vertical arms substantially T-shaped in cross section and being formed at their lower ends with bearing portions 27 and 28 carrying pins 29 and 30 upon which the rack b is pivoted.

The rack b is in the form of a grating or grid comprising a substantially rectangular frame including the opposite vertical side members 31 and 32 and the horizontal top and bottom members 33 and 34, with the said top and bottom members being connected by a plurality of spaced parallel bars 35. The side members 31 and 32 are provided intermediate the ends thereof with bearing portions 36 and 37 which loosely receive the pins 29 and 30 therein so that the said pins constitute a pivotal mounting for the rack. The bearing portions 36 and 37 at the sides of the rack are arranged somewhat closer to the top of the rack than the bottom thereof with the result that the said rack will normally tend to swing to a vertical position. The rack is, however, adapted to be maintained in a slightly inclined position and this may be effected by a set screw 38 threaded through an angle member 39 carried by each of the hanger brackets 23 and 24, said set screws engaging the top 33 of the rack and limiting the forward movement thereof. By proper adjustment of the screws 38, it will be apparent that the angle of inclination of the rack may be varied as desired.

The glass sheet 12 is adapted to be supported on edge in an inclined position, and to support the sheet at its lower edge the bottom 34 of the rack is formed with a forwardly directed, substantially horizontal flange 40 provided upon its upper surface with a wear strip 41. The glass sheet, while supported on edge upon the flange 40, also lays flat against and is supported by the bars 35. The sheet does not contact directly with the bars but with the relatively narrow metal strips 42 which are inserted in channels 43 cut in the bars. The strips 42 are all machined to a uniform level and constitute spaced parallel lines of support for the glass sheet. The glass sheet may be held against accidental displacement by substantially U-shaped spring clips 44 arranged at the top and/or bottom of the rack and inserted through openings 45 in the top and bottom members 33 and 34.

The supporting of the glass sheet on edge, as described above, permits the sheet to expand and contract in its own plane during the heating and subsequent cooling thereof. Also, by disposing the sheet in a slightly inclined position so that it lies flat against the metal strips 42, the tendency of the sheet to sag upon the heating thereof is reduced to a minimum. Thus, when the glass is heated to approximately its point of softening, the friction between the glass and metal strips will be sufficient to hold the sheet in place and prevent it from sagging. The metal strips 42 will also serve to maintain the glass sheet against warping during the sudden cooling thereof. The supporting of the sheet in this manner involves no marring of the glass such as the nicking or notching thereof as is required when suspending the sheet from hooks or tongs. Furthermore, the improved supporting means is also of such construction that the sheet will not be marred or defaced thereby.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In combination in apparatus for supporting a glass sheet during heating and subsequent cooling to temper the same, comprising a supporting means including a pair of spaced hanger brackets, a metal rack for holding the sheet disposed between said hanger brackets and pivoted thereto to turn about a substantially horizontal axis, and means for maintaining said rack in an inclined position.

2. In combination in apparatus for supporting a glass sheet during heating and subsequent cooling to temper the same, comprising a supporting means including a pair of spaced hanger brackets, a metal rack for holding the sheet disposed between said hanger brackets and pivoted thereto to turn about a substantially horizontal axis, said rack comprising a substantially rectangular grating including a plurality of spaced vertical supporting bars and being further provided with means for supporting the glass sheet on edge, and means for maintaining said rack in an inclined position so that the said sheet lies flat against said bars.

3. In combination in apparatus for supporting a glass sheet during tempering, comprising a supporting means including a pair of spaced hanger brackets, a rack for holding the sheet disposed between said hanger brackets and pivoted thereto to turn about a substantially horizontal axis, said rack comprising a substantially rectangular grating including a plurality of spaced vertical supporting bars, the horizontal axis being located nearer one end of the rack than the other so that the said rack normally tends to swing to a vertical position, means at the bottom of the rack for supporting the glass sheet on edge, and means for maintaining said rack in an inclined position so that the said sheet lies flat against said bars.

4. In the tempering of glass sheets wherein the sheet is first heated to substantially the softening point of the glass and then suddenly cooled, the method of supporting the sheet during tempering which consists in arranging the sheet in an inclined position and supporting the same at its lower edge, and in also providing spaced parallel lines of support against which the sheet lies flat in inclined position, the friction between the sheet and lines of support being such as to hold the said sheet in place and prevent it from sagging upon heating and likewise from warping upon cooling.

GERALD WHITE.